US008902908B2

(12) United States Patent  (10) Patent No.: US 8,902,908 B2
Smith et al.  (45) Date of Patent: Dec. 2, 2014

(54) SUPPORT OF A LARGE NUMBER OF VLANS IN A BRIDGED NETWORK

(75) Inventors: Michael R. Smith, San Jose, CA (US); Gyaneshwar S. Saharia, Cupertino, CA (US); Gaetano Borgione, San Jose, CA (US); Atul Rawat, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 64 days.

(21) Appl. No.: 11/416,988

(22) Filed: May 2, 2006

(65) Prior Publication Data

US 2007/0258446 A1  Nov. 8, 2007

(51) Int. Cl.
*H04L 12/28*  (2006.01)
*H04L 12/56*  (2011.01)
*H04L 12/723*  (2013.01)
*H04L 12/46*  (2006.01)

(52) U.S. Cl.
CPC ............ *H04L 12/4641* (2013.01); *H04L 45/50* (2013.01)
USPC ...................................... 370/401; 370/395.3

(58) Field of Classification Search
CPC ............ H04L 12/4641; H04L 12/4633; H04L 12/4625; H04L 12/4654; H04L 63/0272
USPC ......... 370/401, 389, 395.53, 400, 428, 395.3, 370/397
See application file for complete search history.

(56) References Cited

U.S. PATENT DOCUMENTS

| 6,789,121 | B2 * | 9/2004 | Lamberton et al. | 709/227 |
|---|---|---|---|---|
| 6,937,574 | B1 * | 8/2005 | Delaney et al. | 370/254 |
| 7,079,544 | B2 * | 7/2006 | Wakayama et al. | 370/401 |
| 7,092,389 | B2 * | 8/2006 | Chase et al. | 370/389 |
| 7,173,935 | B2 * | 2/2007 | Lou et al. | 370/395.5 |
| 7,599,283 | B1 * | 10/2009 | Varier et al. | 370/216 |
| 7,693,158 | B1 * | 4/2010 | Carrie | 370/395.53 |
| 2002/0089992 | A1 * | 7/2002 | Yip et al. | 370/401 |
| 2002/0174251 | A1 * | 11/2002 | Lasserre | 709/249 |
| 2003/0152075 | A1 * | 8/2003 | Hawthorne et al. | 370/389 |
| 2003/0223378 | A1 * | 12/2003 | Ishwar et al. | 370/254 |
| 2003/0227373 | A1 * | 12/2003 | Lou et al. | 340/310.01 |
| 2004/0066781 | A1 * | 4/2004 | Shankar et al. | 370/389 |
| 2004/0076163 | A1 * | 4/2004 | Ikeda | 370/395.53 |
| 2005/0018605 | A1 * | 1/2005 | Foote et al. | 370/230 |
| 2005/0190773 | A1 * | 9/2005 | Yang et al. | 370/395.53 |
| 2006/0069741 | A1 * | 3/2006 | Morris | 709/217 |
| 2007/0064628 | A1 * | 3/2007 | Tallet et al. | 370/256 |
| 2007/0110060 | A1 * | 5/2007 | Miki et al. | 370/389 |
| 2007/0127376 | A1 * | 6/2007 | Chao et al. | 370/230 |

OTHER PUBLICATIONS

"IEEE Std. 802.1Q-2003, Virtual Bridged Local Area Networks," IEEE Standards for Local and metropolitan area networks, May 7, 2003, 327 pages, IEEE, New York, NY USA.
"IEEE 802.1Q-in-Q VLAN Tag Termination," 2005, 26 pages, Cisco Systems, Inc., San Jose, CA USA.

* cited by examiner

*Primary Examiner* — Hoang-Chuong Vu
(74) *Attorney, Agent, or Firm* — The Law Office of Kirk D. Williams

(57) ABSTRACT

Disclosed are, inter alia, methods, apparatus, data structures, computer-readable media, mechanisms, and means for supporting a large number of virtual local area networks (VLANS) in a bridged network. Packets are received that include 802.1Q Virtual Local Area Network (VLAN) identifiers (VIDs). However, rather than accessing the VLAN forwarding information directly based on the VID as conventionally performed, the VLAN forwarding information to use for a particular packet is determined based on an interface (e.g., virtual or physical interface, port, MPLS label, GRE tunnel or other abstraction of the interface). In other words, the interface associated with the packet identifies a context for determining the VLAN forwarding information based on the VID included in the packet. Therefore, network bridging devices can support more VLANs than that imposed by the 4096 possible values of a VID.

12 Claims, 4 Drawing Sheets

SUPPORT OF A LARGE NUMBER OF VLANS IN A BRIDGED NETWORK

TECHNICAL FIELD

One embodiment of the invention relates to communications and computer systems, especially routers, packet switching systems, and other devices; and more particularly, one embodiment relates to supporting a large number of virtual local area networks (VLANs) in a bridged network, including, but not limited to supporting more than 4096 independent VLANS, wherein the VLAN identifier included in a received frame is a twelve-bit 802.1Q compliant VLAN identifier.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

Implementation of virtual local area networks (VLANs) are well-known in the art and provide a means for allowing hosts located in distributed locations in a network to appear as if they were on a single LAN. FIG. 1A illustrates the (prior art) basic concept in which two VLANs 110 (with hosts 111-113) and 120 (with hosts 121-122) are desired, while these hosts are distributed as shown in example network 150.

A common industry standard used in such networks is IEEE 802.1Q, which was a project in the IEEE 802 standards process to develop a mechanism to allow multiple bridged networks to transparently share the same physical network link without leakage of information between networks (i.e. trunking). IEEE 802.1Q is also the name of the standard issued by this process, and in common usage the name of the encapsulation protocol used to implement this mechanism over Ethernet networks. IEEE 802.1Q also defines the meaning of a virtual LAN or VLAN with respect to the specific conceptual model underpinning bridging at the MAC layer and to the IEEE 802.1D spanning tree protocol. This protocol allows for individual VLANS to communicate with one another with the use of a layer-3 (network) router. 802.1Q does not actually encapsulate the original frame. Instead, it adds an extra 4-bytes in the original Ethernet header. The EtherType is changed to 0x8100, denoting the new frame format. This is followed by a header that contains the following fields:

user_priority: this 3-bit field can be used to store a priority level for the frame. Use of this field is defined in IEEE 802.1p.

CFI: a 1-bit flag denoting whether MAC addresses in the frame are in canonical format. This is called the Canonical Format Indicator.

VID: a 12-bit VLAN ID, allowing up to 4096 VLANs.

FIG. 1B illustrates a prior art 802.1Q compliant switch 176 that sends and receives packets (175) with the 12-bit VLAN ID with hosts 171-172. Switch 172 identifies the VLAN associated with a particular packet based on a look operation on its 12-bit VLAN ID on a VLAN forwarding data structure, and therefore, switch 172 only supports a maximum of 4096 VLANs.

SUMMARY

Disclosed are, inter alia, methods, apparatus, data structures, computer-readable media, mechanisms, and means for supporting a large number of virtual local area networks (VLANs) in a bridged network. One embodiment is used in a network bridge configured to switch frame traffic of multiple independent Virtual Local Area Networks (VLANs) identified by a same VLAN Identifier. A first frame is received on a first interface, the first frame including a VLAN Identifier having a first value. A first internal VLAN identifier corresponding to the first frame is identified based on the first value and that the first frame was received on the first interface, the first internal VLAN identifier identifying frames belonging to a first VLAN. The interface or interfaces from which to forward the first frame is identified based on the first internal VLAN identifier, and the first frame is forwarded from said interfaces identified based on the first internal VLAN identifier. A second frame is received on a second interface, the second frame including a VLAN Identifier having the first value. A second internal VLAN identifier different than the first internal VLAN identifier corresponding to the second frame is identified based on the first value and that the second frame was received on the second interface, the second internal VLAN identifier identifying frames belonging to a second VLAN different from the first VLAN. The interface or interfaces from which to forward the second frame is identified based on the second internal VLAN identifier, and forwarding the second frame from said interfaces identified based on the second internal VLAN identifier. In one embodiment, the VLAN Identifier is a twelve-bit number, and the network bridge supports more than 4096 different VLANs. In one embodiment, the VLAN Identifier is an 802.1Q compliant VLAN identifier.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
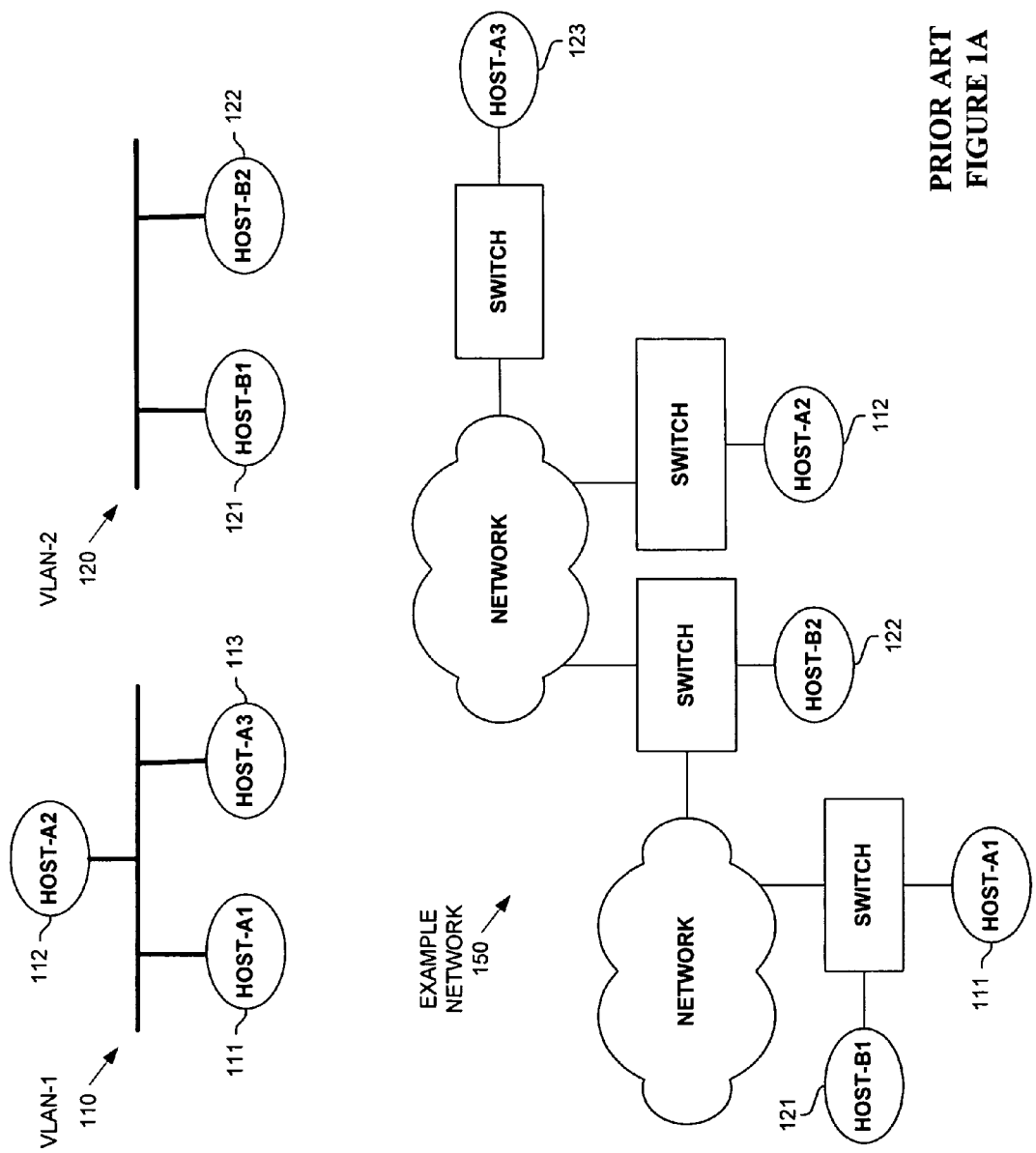
FIG. 1A is a block diagram of a prior art network configuration.
Figure 1B:
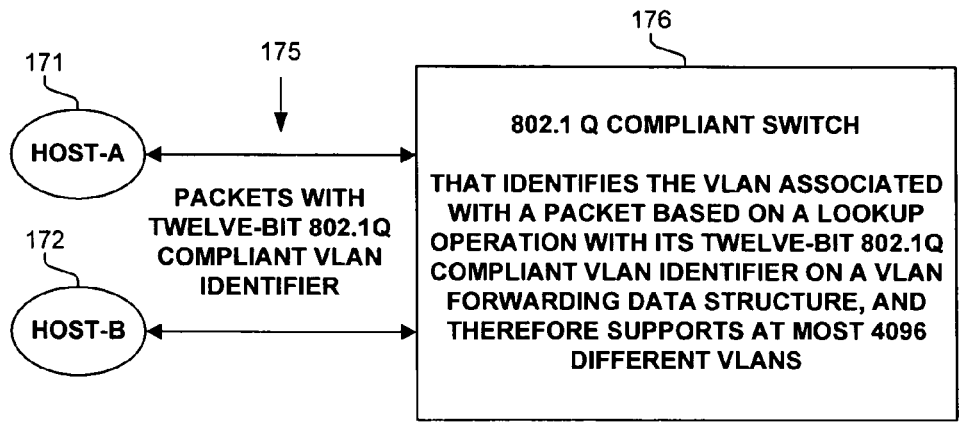
FIG. 1B is a block diagram of a prior art switch.

Disclosed are, inter alia, methods, apparatus, data structures, computer-readable media, mechanisms, and means for supporting a large number of virtual local area networks (VLANS) in a bridged network. Packets are received that include 802.1Q Virtual Local Area Network (VLAN) identifiers (VIDs). However, rather than accessing the VLAN forwarding information directly based on the VID as conventionally performed, the VLAN forwarding information to use for a particular packet is determined based on an interface (e.g., virtual or physical interface, port, MPLS label, GRE tunnel or other abstraction of the interface). In other words, the interface associated with the packet identifies a context for determining the VLAN forwarding information based on the VID included in the packet. Therefore, network bridging devices can support more VLANs than that imposed by the 4096 possible values of a VID.

Note, embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

As used herein, the term "packet" refers to packets of all types or any other units of information or data, including, but not limited to, frames, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields or data of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data. The term or reference to "dropping" a packet or a variant thereof (e.g., drop the packet, the packet is dropped, etc.) is used herein to identify the physical dropping of the packet, causing the packet to be dropped, and/or marking or distinguishing the packet for subsequent dropping or potentially different processing (e.g., a higher probability of being dropped by subsequent processing, Early Congestion Notification marking, etc.) than that of an "admitted" packet. The term "interface" of a networked device broadly refers to a physical interface, a logical interface (e.g., a portion of a physical interface or sometimes referred to in industry as a sub-interface—for example, such as, but not limited to a particular VLAN associated with a network interface), and/or a virtual interface (e.g., traffic grouped together based on some characteristic—for example, such as, but not limited to, a tunnel interface), or even a "port" as commonly used in bridging terminology.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, and/or other storage mechanism. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, data structures, computer-readable media, mechanisms, and means for supporting a large number of virtual local area networks (VLANs) in a bridged network.

One embodiment supports more than 4096 independent VLANs, wherein the VLAN identifier included in a received frame is a twelve-bit 802.1Q compliant VLAN identifier. A particular frame is received on a particular interface of the network bridge, the received particular frame including a particular 802.1Q compliant VLAN identifier. A particular VLAN corresponding to the received particular frame is determined based on the particular 802.1Q compliant VLAN identifier and the particular interface, wherein the network bridge is currently supporting a second VLAN independent of the particular VLAN with the second VLAN also being associated with the particular 802.1Q compliant VLAN identifier. The received particular frame is forwarded out one or more particular interfaces of the network bridge corresponding to the particular VLAN.

In one embodiment, the particular 802.1. Q compliant VLAN identifier is mapped into an internal number representing the particular VLAN based on the particular 802.1Q compliant VLAN identifier and the particular interface. One embodiment performs a lookup operation in a bridge domain data structure based on the internal number to identify these particular interface(s). One embodiment receives a second frame on a second interface of the network bridge, the second frame including the particular 802.1Q compliant VLAN identifier, and identifies a second VLAN corresponding to the second frame based on the particular 802.1Q compliant VLAN identifier and the second interface; wherein the particular VLAN and the second VLAN are independent of each other; and forwards the second frame out one or more interfaces of the network bridge, with these interfaces corresponding to the second VLAN. In one embodiment, the particular 802.1Q compliant VLAN identifier is mapped into a particular internal number representing the particular VLAN based on the particular 802.1Q compliant VLAN identifier and the particular interface; the particular 802.1Q compliant VLAN identifier is mapped into a second internal number representing the second VLAN based on the particular 802.1Q compliant VLAN identifier and the second interface; and the one embodiment determines based on the particular internal number where to forward the particular frame, and identifying based on the second internal number where to forward the second frame. In one embodiment, the network bridge is a single virtual bridge. In one embodiment, the network bridge does not support multiple virtual bridges. In one embodiment, the network bridge refer to a single switching entity. In one embodiment, each of the interfaces is a port of the network bridge.

One embodiment is used in a network bridge configured to switch frame traffic of multiple independent Virtual Local Area Networks (VLANs) identified by a same VLAN Identifier. A first frame is received on a first interface, the first frame including a VLAN Identifier having a first value. A first internal VLAN identifier corresponding to the first frame is identified based on the first value and that the first frame was received on the first interface, the first internal VLAN identifier identifying frames belonging to a first VLAN. The interface or interfaces from which to forward the first frame is identified based on the first internal VLAN identifier, and the first frame is forwarded from said interfaces identified based on the first internal VLAN identifier. A second frame is received on a second interface, the second frame including a VLAN Identifier having the first value. A second internal VLAN identifier different than the first internal VLAN identifier corresponding to the second frame is identified based on the first value and that the second frame was received on the second interface, the second internal VLAN identifier identifying frames belonging to a second VLAN different from the first VLAN. The interface or interfaces from which to forward the second frame is identified based on the second internal VLAN identifier, and forwarding the second frame from said interfaces identified based on the second internal VLAN identifier.

In one embodiment, the VLAN Identifier is a twelve-bit number, and the network bridge supports more than 4096 different VLANs. In one embodiment, the VLAN Identifier is an 802.1Q compliant VLAN identifier. In one embodiment, each of the interfaces is a port of the network bridge.

Figure 2A:
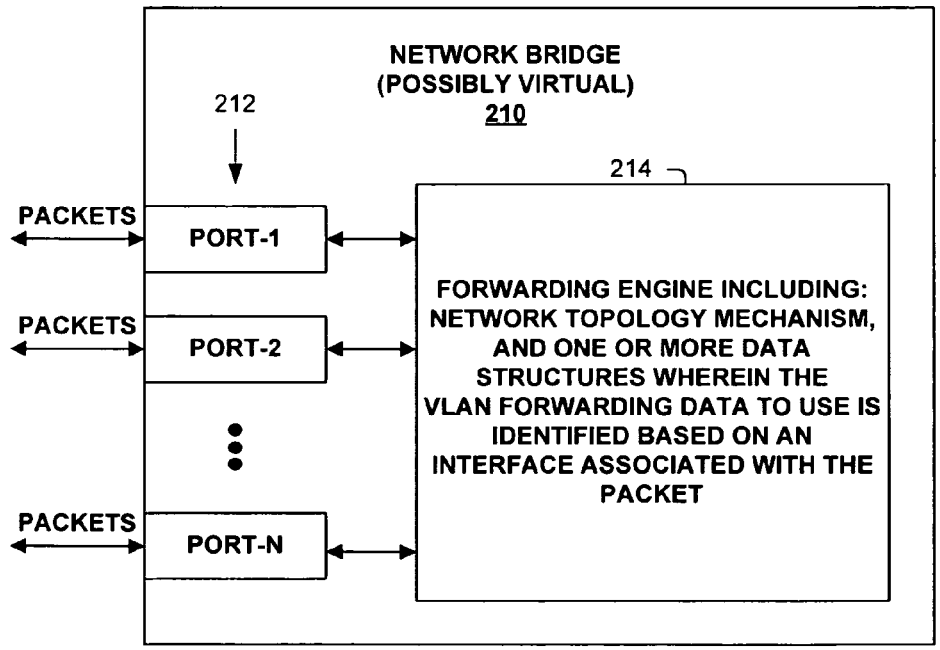
FIGS. 2A-B are block diagrams illustrating a few of an extensible number of different switches supporting a large number of virtual local area networks (VLANs) in one embodiment.

Turning to the figures, FIG. 2A illustrates a bridge 210 (possibly a virtual bridge) which sends and receives packets (at least some of which) including a 12-bit VLAN ID on its ports 212. Forwarding engine 214 includes a network topology mechanism (typically running Spanning Tree Protocol) and one or more data structures, wherein the VLAN forwarding data to use for a particular packet is identified based on an interface associated with the particular packet and the packet's VID. In one embodiment, the interface is identified based on the port on which the particular packet was received. Other embodiments may determine this interface in other ways, such as, but not limited to, a virtual or physical interface, MPLS label, GRE tunnel and/or other abstraction of the interface.

Figure 2B:
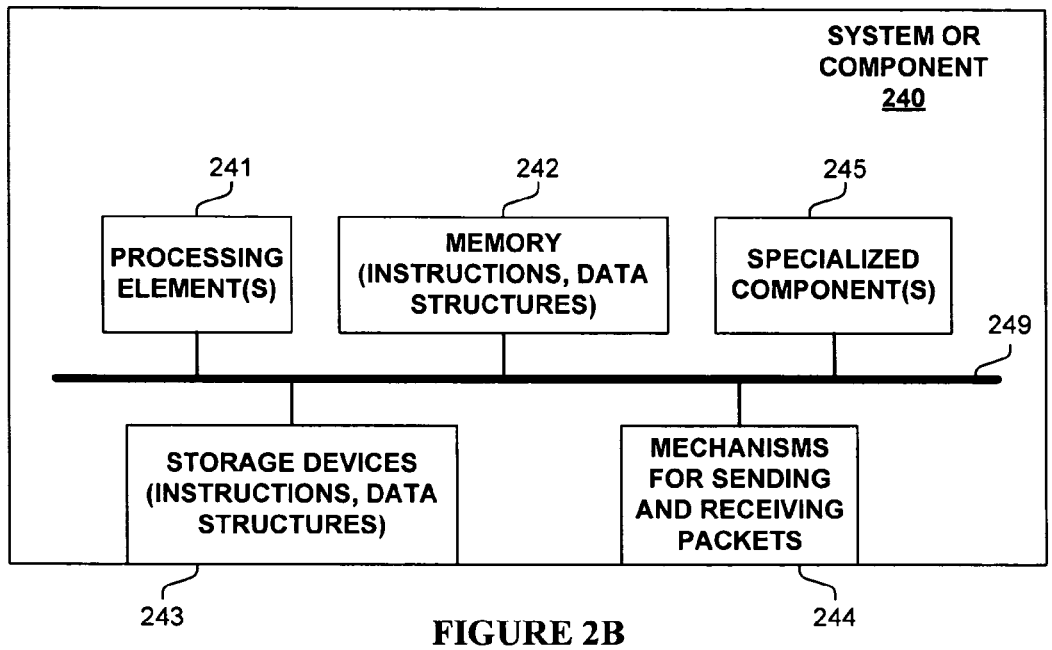

FIG. 2B is block diagram of a system or component 240 used in one embodiment that supports a large number of virtual local area networks (VLANs) in a bridged network. In one embodiment, system or component 240 performs one or more processes corresponding to one of the flow diagrams and/or store one or more of the data structures illustrated or otherwise described herein.

In one embodiment, system or component 240 includes one or more processing elements 241, memory 242, storage devices 243, mechanisms for sending and receiving packets 244, and specialized components 245, which are typically communicatively coupled via one or more communications mechanisms 249, with the communications paths typically tailored to meet the needs of the application.

Various embodiments of component 240 may include more or less elements. The operation of component 240 is typically controlled by processing element 241 using memory 242 and storage devices 243 to perform one or more tasks or processes. Memory 242 is one type of computer-readable medium, and typically comprises random access memory (RAM), read only memory (ROM), flash memory, integrated circuits, and/or other memory components. Memory 242 typically stores computer-executable instructions to be executed by processing element 241 and/or data which is manipulated by processing element 241 for implementing functionality in accordance with an embodiment. Storage devices 243 are another type of computer-readable medium, and typically comprise solid state storage media, disk drives, diskettes, networked services, tape drives, and other storage devices. Storage devices 243 typically store computer-executable instructions to be executed by processing element 241 and/or data which is manipulated by processing element 241 for implementing functionality in accordance with an embodiment.

Figure 3A:
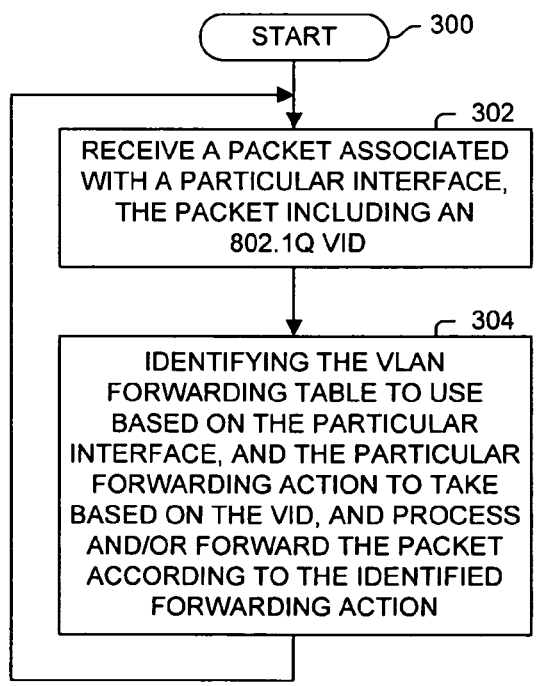
FIG. 3A is flow diagram illustrating a process used in one embodiment for supporting a large number of virtual local area networks (VLANs) in a bridged network.

FIG. 3A is a flow diagram illustrating a process used in one embodiment for supporting a large number of virtual local area networks (VLANs) in a bridged network. Processing begins with process block 300, and proceeds to process block 302, wherein a packet associated with a particular interface is received, with the packet containing an 802.1Q VID. In process block 304, the VLAN forwarding table to use is identified based on the interface, with the particular forwarding action determined based on the VID within the VLAN forwarding table. The packet is processed and/or forwarded according to the identified forwarding action. Processing returns to process block 302 to receive another packet.

Figure 3B:
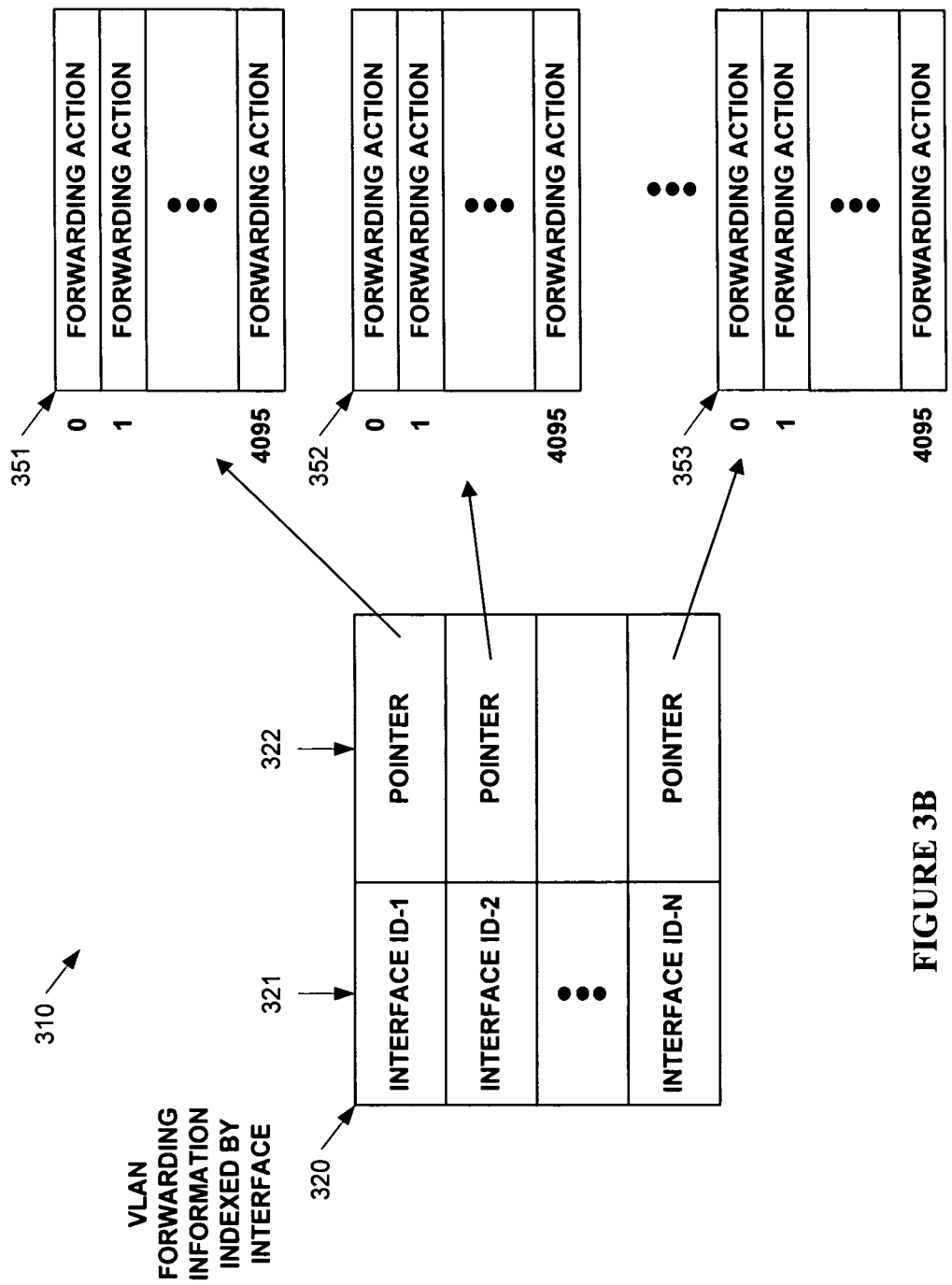
FIG. 3B is a data structure used in one embodiment.

FIG. 3B is a data structure 310 used in one embodiment for identifying a forwarding action based on the interface and VID associated with a packet. As shown, the VLAN forwarding information (e.g., bridge domain forwarding table, etc.) 351-353 (i.e., the 802.1Q context in which to evaluate the VID) is identified (322) by data structure 320 based on the interface ID (321). The VID is then used within forwarding information 351-353 to identify the particular forwarding action. Of course, an unlimited number of variations of data structure 310 are possible, whether implemented as a single or multiple data structures. As illustrated by data structure 310, a same VID used in two different packets, each associated with a different interface having different VLAN forwarding information associated therewith, can result in different forwarding actions; rather than in a same forwarding action as conventionally done.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, comprising:
  a plurality of operations performed by a network bridge supporting more than 4096 independent Virtual Local Area Networks (VLANs), wherein a VLAN identifier included in a received frame is a twelve-bit 802.1Q compliant VLAN identifier, wherein the plurality of operations include:
  receiving a particular frame on a particular interface of a plurality of interfaces of the network bridge, said received particular frame including a particular 802.1Q compliant VLAN identifier wherein the particular interface is identified based on a particular tunnel on which the particular frame was received;
  determining a particular VLAN corresponding to said received particular frame based on the particular 802.1Q compliant VLAN identifier and the particular interface, wherein the network bridge is currently supporting a second VLAN independent of the particular VLAN with the second VLAN also being associated with the particular 802.1Q compliant VLAN identifier;
  forwarding said received particular frame out one or more particular interfaces of the network bridge, said one or more particular interfaces corresponding to the particular VLAN; with a VLAN identifier of said forwarded particular frame being the particular 802.1Q compliant VLAN identifier;
  receiving a second frame on a second interface of the plurality of interfaces of the network bridge, the second frame including the particular 802.1Q compliant VLAN identifier;
  identifying the second VLAN corresponding to the second frame based on the particular 802.1Q compliant VLAN identifier and the second interface;
  forwarding the second frame out one or more interfaces of the network bridge, said one or more interfaces corresponding to the second VLAN;
  wherein: the particular 802.1Q compliant VLAN identifier, of the particular frame, is mapped into a particular internal number representing the particular VLAN based on the particular 802.1Q compliant VLAN identifier and the particular interface; the particular 802.1Q compliant VLAN identifier, of the second frame, is mapped into a second internal number representing the second VLAN based on the particular 802.1Q compliant VLAN identifier and the second interface;

identifying based on the particular internal number where to forward the particular frame; and identifying based on the second internal number where to forward the second frame.

2. The method of claim 1, wherein said method includes performing a lookup operation in a bridge domain data structure based on the particular internal number to identify said one or more particular interfaces.

3. The method of claim 1, wherein the network bridge is a single virtual bridge.

4. The method of claim 1, wherein the network bridge does not support multiple virtual bridges.

5. The method of claim 1, wherein network bridge does not process said received particular frame in a manner which modifies the header of said received particular frame.

6. The method of claim 1, wherein said operation of forwarding said received particular frame out one or more particular interfaces of the network bridge forwards said received particular frame out a plurality of said one or more particular interfaces.

7. A network bridge supporting more than 4096 independent Virtual Local Area Networks (VLANs), wherein a VLAN identifier included in a received frame is a twelve-bit 802.1Q compliant VLAN identifier, the network bridge comprising:

a particular interface of a plurality of interfaces configured to receive a particular frame from a source outside the network bridge, with said received particular frame including a particular 802.1Q compliant VLAN identifier, and wherein the particular interface is identified based on a particular tunnel on which the particular frame was received;

one or more processing elements configured to determine a particular VLAN corresponding to said received particular frame based on the particular 802.1Q compliant VLAN identifier and the particular interface, including identifying based on a particular internal number where to forward the particular frame, wherein the network bridge is currently supporting a second VLAN independent of the particular VLAN with the second VLAN also being associated with the particular 802.1Q compliant VLAN identifier;

one or more particular interfaces of the network bridge configured to forward said received particular frame out of the network bridge, with said one or more particular interfaces corresponding to the particular VLAN; with a VLAN identifier of said forwarded particular frame being the particular 802.1Q compliant VLAN identifier;

a second interface of the plurality of interfaces configured to receive a second frame including the particular 802.1Q compliant VLAN identifier from a source outside the network bridge;

one or more frame processing elements configured to identifying the second VLAN corresponding to the second frame based on the particular 802.1Q compliant VLAN identifier and the second interface, including identifying based on a second internal number where to forward the second frame;

one or more interfaces corresponding to the second VLAN of the network bridge configured to forward the second frame out of the network bridge; and wherein: the particular 802.1Q compliant VLAN identifier, of the particular frame, is mapped into the particular internal number representing the particular VLAN based on the particular 802.1Q compliant VLAN identifier and the particular interface; the particular 802.1Q compliant VLAN identifier, of the second frame, is mapped into the second internal number representing the second VLAN based on the particular 802.1Q compliant VLAN identifier and the second interface.

8. The network bridge of claim 7, wherein said identifying based on a particular internal number where to forward the particular frame includes performing a lookup operation in a bridge domain data structure based on the particular internal number to identify said one or more particular interfaces.

9. The network bridge of claim 7, wherein the network bridge is a single virtual bridge.

10. The network bridge of claim 7, wherein the network bridge does not support multiple virtual bridges.

11. The network bridge of claim 7, wherein network bridge does not process said received particular frame in a manner which modifies the header of said received particular frame.

12. The network bridge of claim 7, wherein said operation of forwarding said received particular frame out one or more particular interfaces of the network bridge forwards said received particular frame out a plurality of said one or more particular interfaces.

* * * * *